(12) United States Patent
Florian (10) Patent No.: US 9,928,226 B2
(45) Date of Patent: Mar. 27, 2018

(54) LOCAL AUTHORING AND EDITING OF CLOUD-BASED ELECTRONIC CONTENT

(71) Applicant: Adobe Systems Incorporated, San Jose, CA (US)

(72) Inventor: Ondrej Florian, Allschwil (CH)

(73) Assignee: Adobe Systems Incorporated, San Jose, CA (US)

( * ) Notice: Subject to any disclaimer, the term of this patent is extended or adjusted under 35 U.S.C. 154(b) by 799 days.

(21) Appl. No.: 13/661,984

(22) Filed: Oct. 26, 2012

(65) Prior Publication Data

US 2013/0254656 A1 Sep. 26, 2013

Related U.S. Application Data

(60) Provisional application No. 61/613,039, filed on Mar. 20, 2012.

(51) Int. Cl.
| | | |
|---|---|---|
| G06F 17/00 | (2006.01) | |
| G06F 17/22 | (2006.01) | |
| G06F 17/24 | (2006.01) | |
| G06F 17/30 | (2006.01) | |

(52) U.S. Cl.
CPC .......... *G06F 17/2288* (2013.01); *G06F 17/24* (2013.01); *G06F 17/30893* (2013.01)

(58) Field of Classification Search
CPC ........................... G06F 17/24; G06F 17/30011
USPC .................................................. 715/229, 255
See application file for complete search history.

(56) References Cited

U.S. PATENT DOCUMENTS

| | | | |
|---|---|---|---|
| 7,941,748 B1* | 5/2011 | Sundermeyer et al. ...... 715/255 |
| 8,352,573 B2* | 1/2013 | Chandra ........... G06F 17/30899 709/218 |
| 8,453,112 B1* | 5/2013 | Brambley ................. G06F 8/71 717/106 |
| 8,732,653 B1* | 5/2014 | Xu ............................... 717/101 |
| 2005/0240657 A1* | 10/2005 | Yamaguchi ......... G06F 17/3089 709/217 |
| 2005/0246283 A1* | 11/2005 | Gwiazda et al. ............... 705/52 |
| 2006/0031404 A1* | 2/2006 | Kassab ......................... 709/218 |
| 2009/0254912 A1* | 10/2009 | Roundtree ................ G06F 8/61 718/102 |
| 2010/0162096 A1* | 6/2010 | Morrill ............. G06F 17/30896 715/234 |
| 2010/0241948 A1* | 9/2010 | Andeen ............... G06F 17/2247 715/234 |
| 2012/0173612 A1* | 7/2012 | Vegesna-Venkata ... G06F 17/24 709/203 |

(Continued)

*Primary Examiner* — Stephen Hong
*Assistant Examiner* — Matthew Ludwig
(74) *Attorney, Agent, or Firm* — Kilpatrick Townsend & Stockton LLP (57) ABSTRACT

One exemplary embodiment involves downloading electronic content for editing at a local editing application, the electronic content received from a remote network source accessed through a web browser's connection to the source, the local editing application separate from the web browser. The embodiment further involves identifying edits made at the local editing application to the electronic content resulting in a new version of the electronic content. And, the embodiment further involves initiating an upload of the new version of the electronic content through the browser's network connection to the source.

22 Claims, 6 Drawing Sheets

(56) References Cited

U.S. PATENT DOCUMENTS

2012/0324418 A1* 12/2012 Fallon ................ G06F 8/36
717/101
2013/0151940 A1* 6/2013 Bailor ................ G06F 17/24
715/229

* cited by examiner

LOCAL AUTHORING AND EDITING OF CLOUD-BASED ELECTRONIC CONTENT

CROSS-REFERENCE TO RELATED APPLICATION

This application claims priority to U.S. Provisional Application Ser. No. 61/613,039 filed Mar. 20, 2012 and titled "Local Authoring and Editing of Cloud-Based Electronic Content," the contents of which are hereby incorporated by reference.

FIELD

This disclosure relates generally to computer software and more particularly relates to the creation, modification, use, and distribution of electronic content.

BACKGROUND

Internet browser applications are used to access many types of electronic content. In some contexts, such as in the case of cloud-based systems, a browser can be used to access electronic content that is provided through a network for local use and editing. In many cases, the browser is used to access the content but cannot be used to view or edit the content. For example, a user may use a browser to request an image document from a cloud-based system but cannot edit the image using the browser. Instead, the user must use another local application to edit the document and often be subjected to cumbersome and/or insecure options for providing the edited document back to the cloud-based system.

Local applications outside of the browser are generally not able to open, edit, and save cloud-based resources, e.g., a document stored in a content management system, directly due to technical limitations, e.g., of the hyper text transfer protocol (HTTP)/hyper text transfer protocol (HTTPS). For example, opening, editing, and saving such a resource may involve a cumbersome processes. The user must download a resource to the user's local storage, start a desktop application to edit and save it. The user must then open an upload form which asks for selection of a document to upload, find the document that was edited, submit the document for the web browser to upload, and confirm that the new document was uploaded as desired. Such processes require significant user interaction and tracking and there is a possibility that mistakes will result in errors and lost content.

A remote file system such as a network file system (NFS)/server message block (SMB) may be used to mount a remote resource or otherwise make the resource available to a local application under a locally-accessible path (e.g., Z:\data). For example, a user may mount the remote file system before editing a resource (usually after some kind of authentication and even though potentially logged into the website already), navigate the remote file system to find the resource to edit, open the resource in the desktop application, edit and save the resources, go back to the website that uses the resource, and refresh the page in order to see the new version. In this exemplary scenario, user authentication involves significant user effort. Thus, even though a user is logged into the website already using a web browser, because the user generally needs sufficient privileges to mount the remote system separate from that browser access, the user will be required to separately enter his/her credentials. Using components that are external to a browser to transfer data to and from a cloud that is accessed through a browser can require significant user effort and inefficiencies since such access generally requires a plug-in or other browser-external component to run in its own sandbox and therefore maintain its own network session that is separate from that of the browser. This means that the user will likely be forced to re-authenticate every time he/she uses such a component and exposes the component to potentially being blocked by a firewall or the like.

SUMMARY

One exemplary embodiment involves downloading electronic content for editing at a local editing application, the electronic content received from a remote network source accessed through a web browser's connection to the source, the local editing application separate from the web browser. The embodiment further involves identifying edits made at the local editing application to the electronic content resulting in a new version of the electronic content. And, the embodiment further involves initiating an upload of the new version of the electronic content through the browser's network connection to the source.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

Features, aspects, and advantages of the present disclosure are better understood when the following Detailed Description is read with reference to the accompanying drawings, where.

DETAILED DESCRIPTION

Computer-implemented systems and methods for accessing electronic content for editing and saving from a local application are disclosed. The electronic content may be obtained from a network source such as a cloud-based service accessed through a web browser. The electronic content may be received and edited by a person using a local editing application separate from the browser. For example, a cloud-based service's webpage may allow a user to select a particular image file to be edited by selecting an option on the webpage. Upon such a selection, a copy of the file is downloaded to the device through the browser's network connection and opened in an image editing application. Instructions associated with the webpage (e.g., JavaScript, other script based commands, etc.) may direct the downloading of the image file and/or opening of the image file in the image editing application. Alternatively, instructions associated with the webpage (e.g., JavaScript, other script based commands, etc.) may indirectly direct the downloading of the image and opening of the image editing application using an agent, e.g., an applet, rich internet application, plug-in, etc. To enhance security the agent can be signed or other security mechanism employed to ensure that the agent is trusted.

Edits made locally to the electronic content may be tracked in various ways. In one embodiment, a temporary copy of the content is stored locally and opened by the editing application and changes to the file are monitored. In the above example, a copy of the image may be stored on a local hard drive of the local device and a process used to monitor for changes to the document. As a specific example, an agent, e.g., an applet, rich internet application, plug-in, etc., may create the temporary file when opening the editing application for editing and then monitor the temporary file for changes, e.g., by monitoring a "last changed" file field, "last modified" file field, or the like.

Such an agent may be an applet, rich interact application, plug-in or other component that monitors for a change. Such a change may be detected when the editing application saves an edited version of the file. For example, when the user uses a save command in an image editing application, a new version of the temporary file may be placed on the local hard drive. The agent may detect this and initiate an upload of the new version of the file through the browser's network connection to the source, e.g., to the cloud-based service where it will replace the prior version of the electronic content.

These illustrative examples are given to introduce the reader to the general subject matter discussed here and are not intended to limit the scope of the disclosed concepts. The following sections describe various additional embodiments and examples with reference to the drawings in which like numerals indicate like elements.

Figure 1:
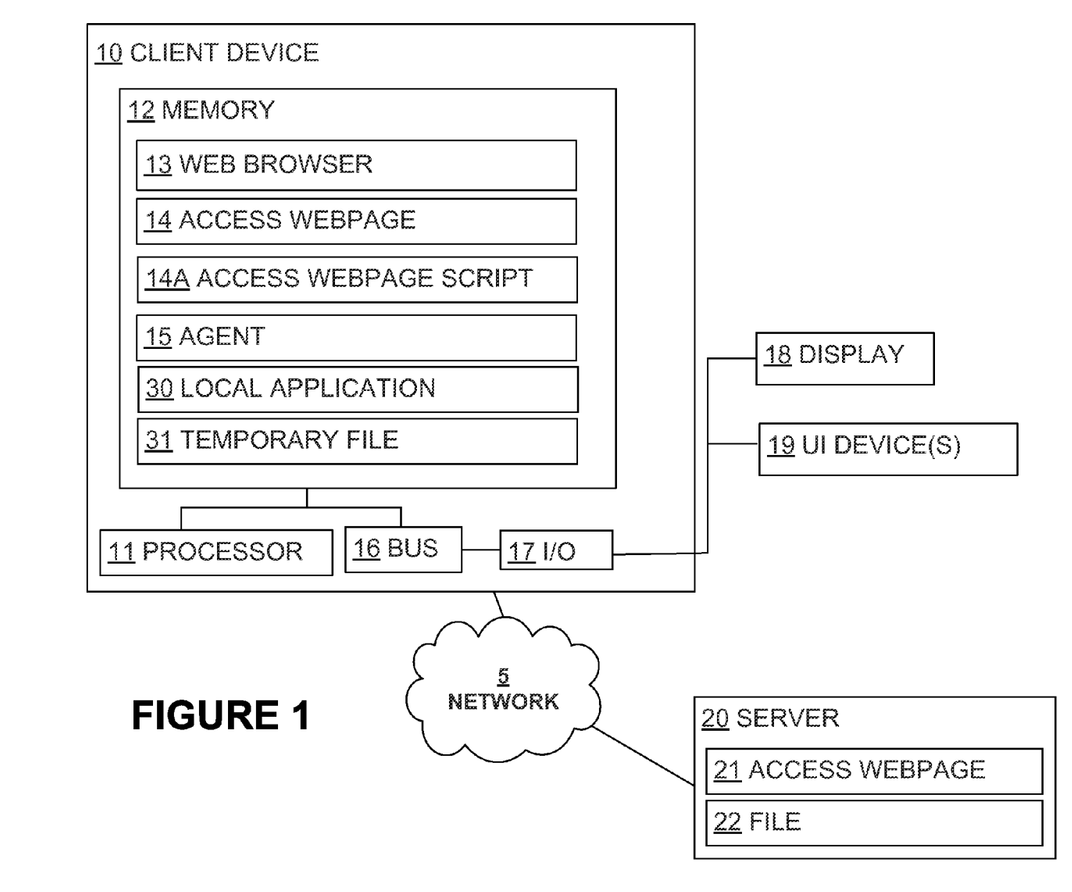
FIG. 1 is a block diagram depicting exemplary computing devices in an exemplary computing environment for implementing certain embodiments.

Referring now to the drawings, FIG. 1 is a block diagram depicting exemplary computing devices in an exemplary computing environment for implementing certain embodiments. Applications and other electronic content execute or are otherwise used on the exemplary computer device 10 and are shown as functional components or modules. As is known to one of skill in the art, such applications and content may be resident in any suitable computer-readable medium and execute on any suitable processor. For example, as shown the client device 10 comprises a computer-readable medium such as a random access memory (RAM) 12 coupled to a processor 11 that executes computer-executable program instructions and/or accesses information stored in memory 12. Such a processor 11 may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript. The instructions may be executed or otherwise used to provide one or more of the features described herein.

The client device 10 may also comprise a number of external or internal devices such as a mouse, a CD-ROM, DVD, a keyboard, a display, audio speakers, one or more microphones, or any other input or output devices. For example, device 10 is shown with a display 18 and various user interface devices 19. A bus, such as bus 16, is included in the device 10. Device 10 could be a personal computing device, a mobile device, or any other type of electronic devices appropriate for providing one or more of the features described herein.

FIG. 1 illustrates an exemplary device 10 that comprises, in memory 12, a web browser 13 and an exemplary server that makes an access webpage 21 available. For example, web browser 13 may download access webpage 21 as access webpage 14 and access webpage script 14A on the client device 10. Using the access webpage 14 and access webpage script 14A features provided by the web browser, a user can gain access to access remotely-stored electronic content, e.g., content stored on server 20, on a cloud-based system, etc. For example, a user may enter a user name, password, and/or other credentials to obtain such access. The access to the electronic content may be limited to access through network transfer conducted through the web browser. As a specific example, a user may use the access webpage to provide information and commands to log in for access and then to identify file 22 on server 20 to be edited on the client device.

Webpage instructions may respond to such a request by initiating the downloading, monitoring, and uploading of the file 22. For example, access webpage script 14A, e.g., in the form of JavaScript, may provide a payload to an agent 15 that may be implemented as an applet, rich internet application, plug-in, etc., to execute a location application 30 for editing and create temporary file 31 to store a temporary version of the file 22, a copy of which is received from server 20. The temporary file 31 is opened and edited by the local application 30. The agent 15 may continue to operate while the user uses the local application 30 to edit the content of the temporary file 31. For example, the agent 15 may periodically monitor for changes to the metadata or other attribute of temporary file 31.

Once the temporary file is changed, e.g., upon a save of the content of the temporary file 31 in the local application 30, the agent 15 notifies the webpage processes, and accesses webpage script 14A, e.g., in the form of JavaScript, may upload the temporary file 31, and replace file 22 on server 20. In this way, the user of the editing application can save the edits without having to manually upload content that has been edited. In this example, the user simply uses the same save command that the user uses when saving locally.

One embodiment provides an application programming interface (API) for a web application to provide the ability to open a resource in a desktop or other local application, marshal a resource's data through an already established and authenticated browser session, monitor for changes made locally by the local application, marshal the changed document data back to the remote or cloud-based service using the browser's session, and/or refreshes the resource in the webpage.

Figure 2:
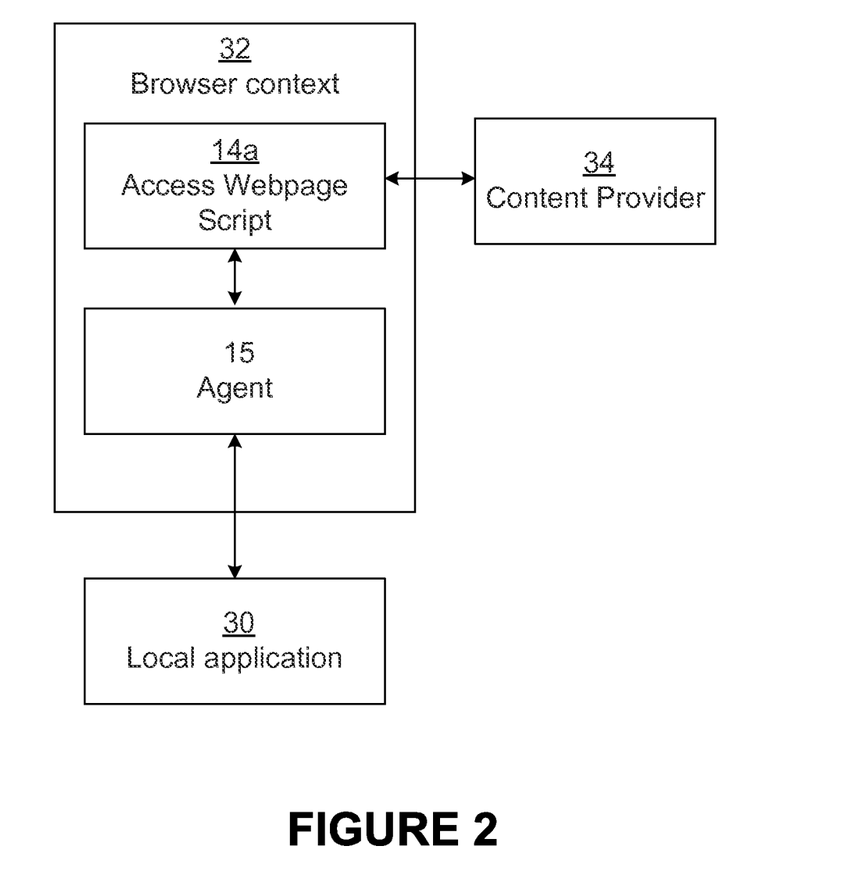
FIG. 2 is a flow chart illustrating an exemplary method of accessing electronic content for editing by a local application.

FIG. 2 is a flow chart illustrating an exemplary method of accessing electronic content for editing by a local application. In the example, a content provider 34 provides content to a browser within a browser context 32. For example, the content provider 34 may provide an audio file that can be listened to via the browser but not edited using the browser.

Editing the electronic content can be accomplished using a separate local application 30 outside of the browser context yet local to the browser, i.e., on the same computer or device. The local editing application can be provided via a cloud-based service such that the editing functionality is made available locally. Initiation of editing of the electronic content can be accomplished in any suitable way. In one example, a user desiring to edit the content selects an edit option within the browser context to initiate such editing. For example, the user may use a webpage to download the above-mentioned audio content and then select a command on the webpage (e.g., by selecting an icon, button, link, or the like) to initiate opening of the audio in an audio editing application where the user is able to edit the audio.

In the example of FIG. 2, access webpage script 14a is executed when editing of the electronic content is initiated. The access webpage script 14a is executed from within a browser context 30 and creates agent 15 to execute local application 30, load the electronic content for editing in local application 30, monitor for edits made to local application 30, and provide edited versions of the electronic content for returning to the content provider 34. The description of an access webpage script and agent in the execution of such a script are merely exemplary. The features of various embodiments disclosed herein need not be accomplished via these exemplary functional blocks and can alternatively involve different or varying components.

Figure 3:
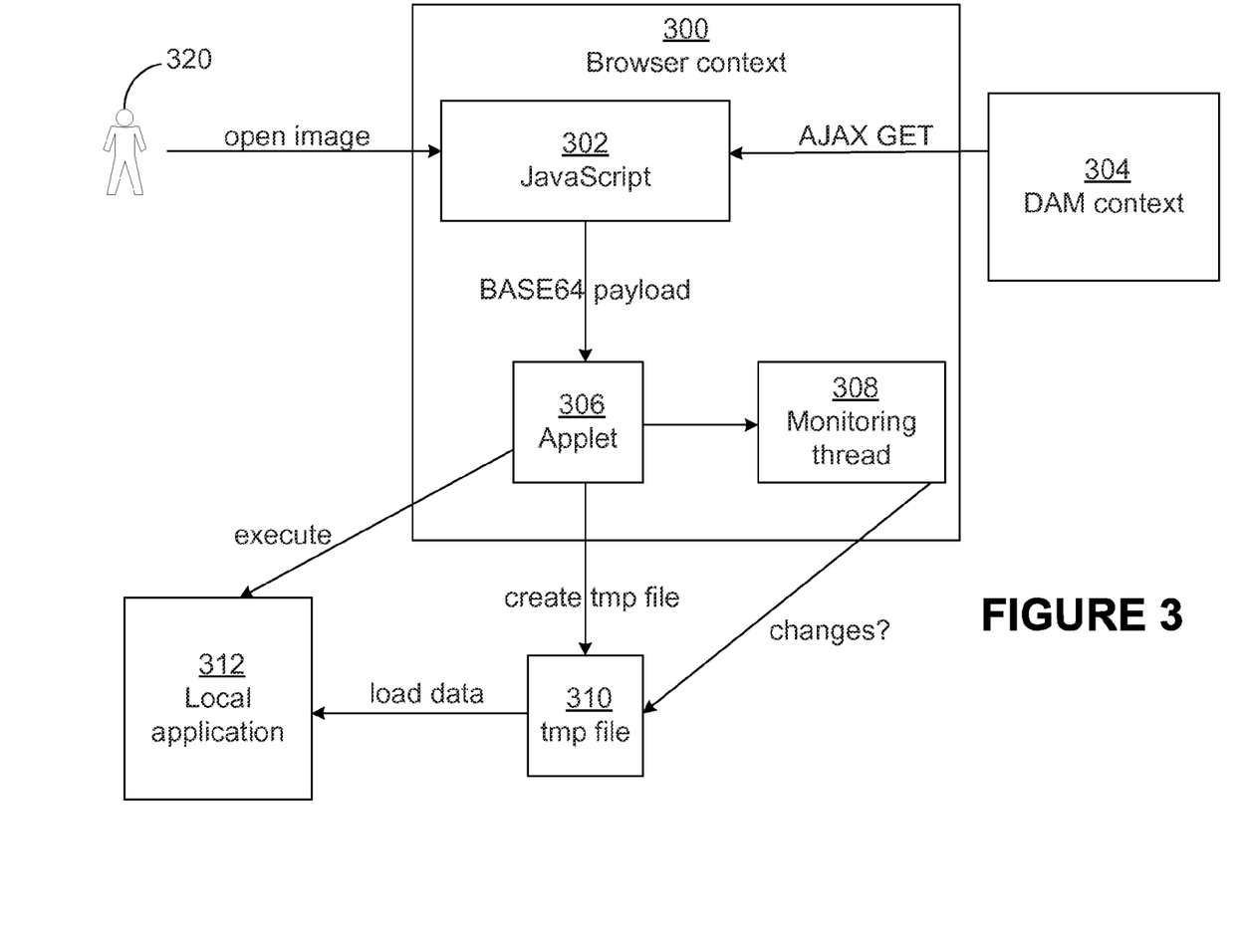
FIG. 3 is a flow chart illustrating an exemplary method of accessing and monitoring electronic content to be edited on a local application.

FIG. 3 is a flow chart illustrating an exemplary method of accessing and monitoring electronic content to be edited on a local application. In this example, a user 320 opens an image received from a document/asset storage such as Digital Asset Management ("DAM") context 304 within a browser context. For example, the user may interact with a webpage button to trigger a JavaScript function 302. The JavaScript function 302 triggers an asynchronous JavaScript and XML programming (AJAX) call to retrieve a selected asset (for example as a BASE64 payload) and passes the asset to an applet 306.

The applet 306 may decode the asset, for example decoding a BASE64 payload, and save the asset as a temporary file 310 on the local system and start a monitoring thread 308 that checks modification data of the temporary file 310 to monitor for changes. The applet 306 passes the temporary file path to the local application 312 (e.g., Adobe Photoshop®). The local application 312 loads the temporary file 310 from the local disk and presents it to the user 320 for editing. As another example, a document file stored may be stored and accessed via a cloud or web-based system such as Microsoft SharePoint® and Microsoft Word® or another document editing application would be able to open it, edit it and save it online.

Figure 4:
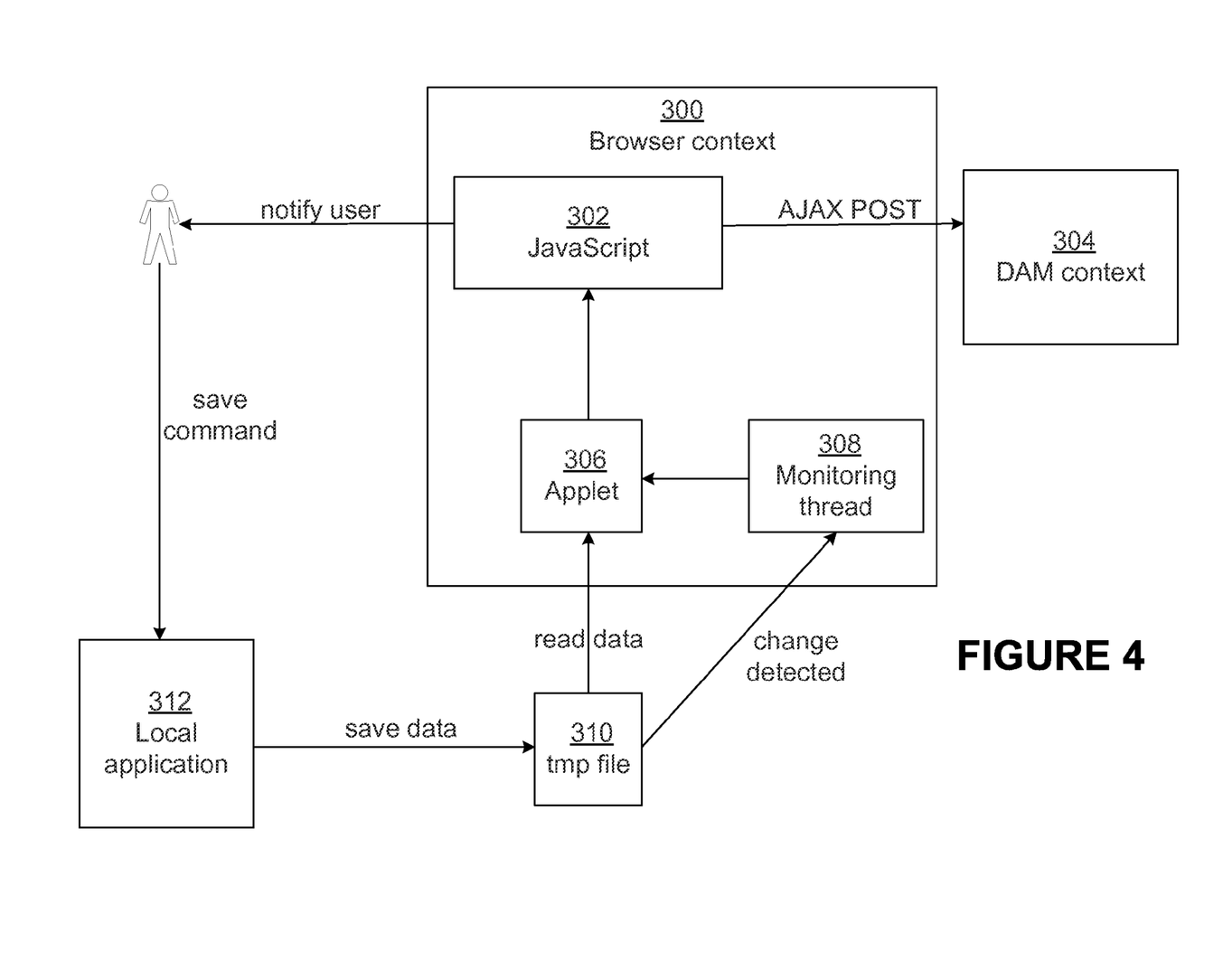
FIG. 4 is a flow chart illustrating an exemplary method of providing content as edited on a local application to replace content provided by a content source.

FIG. 4 is a flow chart illustrating an exemplary method of providing content as edited on a local application 312 to replace content provided by a content source. The method enables saving remotely stored electronic content that was edited by a local application. In this example, which uses the functional blocks of FIG. 3, the user saves edited content using a regular save command in the local application 312. This causes the temporary file 310 to be updated with the edited content. The monitoring thread 308 detects the change in the temporary file 310 and notifies the applet 306. The applet may encode the content, for example, by encoding it as BASE64, and passes the edited content to the JavaScript 302. The JavaScript 302 triggers an AJAX POST call to upload the data DAM context. The JavaScript also notifies the user that the file has changed and the electronic content is refreshed in the browser context, e.g., on a webpage used to access or display the content.

Figure 5:
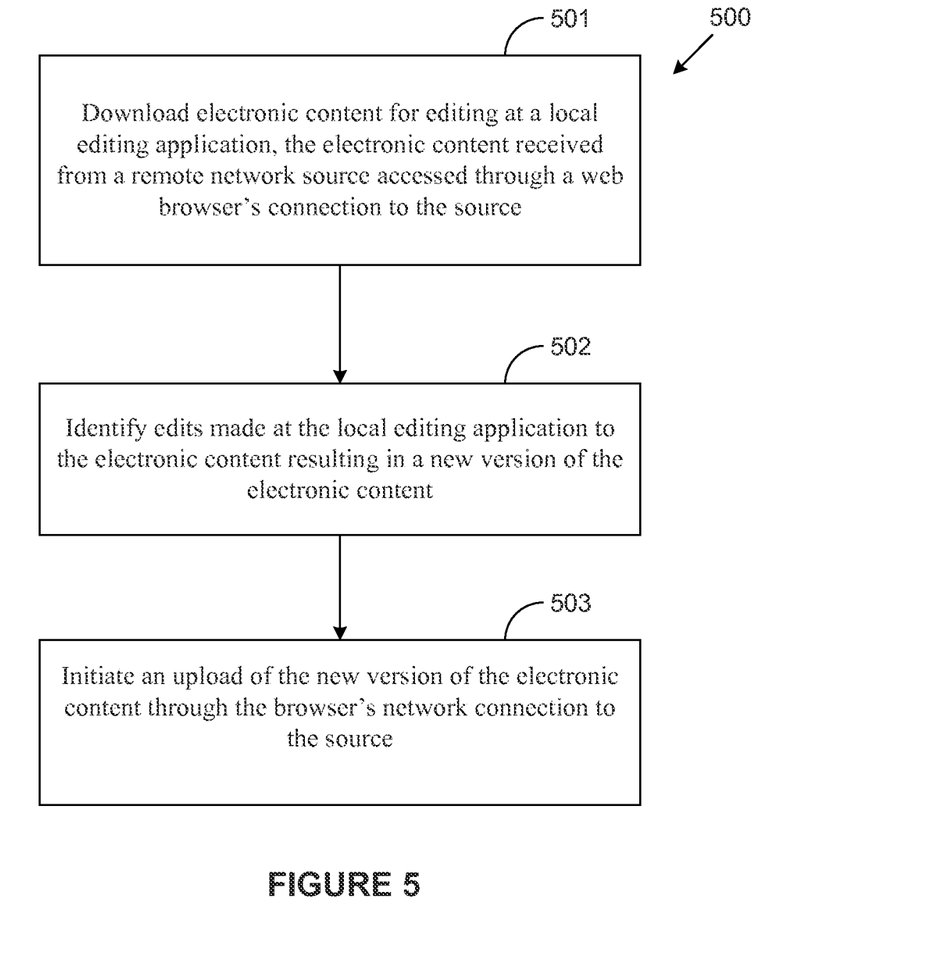
FIG. 5 is a flow chart illustrating an exemplary method of downloading, locally editing, and uploading electronic content.

FIG. 5 is a flow chart illustrating an exemplary method 500 of downloading, locally editing, and uploading electronic content. The exemplary method could be carried out or otherwise provided on any suitable computing device and, for example, could be carried out by executing computer-executable program instructions on client device 10 of FIG. 1.

The method 500 involves downloading electronic content for editing at a local editing application, the electronic content received from a remote network source accessed through a web browser's connection to the source, as shown in block 501. The local editing application is separate from the web browser, i.e., it is not within the browser context. The "browser context" here includes a browser session that contains information about a user and that is tied to a session on the server side. In one example, when a user logs in, a session is created and all user requests will be tied to that user's credentials. For example, permissions/rights will be evaluated in context of that session. In this example, logging out will close the session, e.g., even if someone uses the user's computer, he or she won't have any access anymore. The browser can, for example, run all the client side code (e.g. applet or JavaScript) in a sandbox which is tied to the user's browser session. The downloading of the electronic content may be initiated and/or controlled by scripts within a webpage or otherwise executed within the browser context.

The method 500 further involves identifying edits made at the local editing application to the electronic content resulting in a new version of the electronic content, as shown in block 502. The downloading of the identification of edits and related tasks may be initiated and/or controlled by scripts within a webpage or otherwise executed within the browser context. One or more scripts may be interpreted or otherwise executed by a web browser to store a temporary file comprising the electronic content locally, open the temporary file of the electronic content in the local editing application, and monitor for edits made to the temporary file. One or more scripts may be interpreted or otherwise executed by a web browser to initiate an applet, a rich internet application, a plug-in, or other suitable agent to provide such functionality. The agent may be signed to ensure that the agent is trusted. For example, as the browser runs code in a sandbox (e.g. the scripts or applet) it may not be able to manipulate files on the user's computer. The browser may be tied to the server rather than the client and thus, need an agent to do certain actions. The agent may be signed and the communication between the browser and the agent encrypted in order to guarantee authenticity of the electronic content. The reduces the risk of a foreign agent stealing the data.

Figure 6:
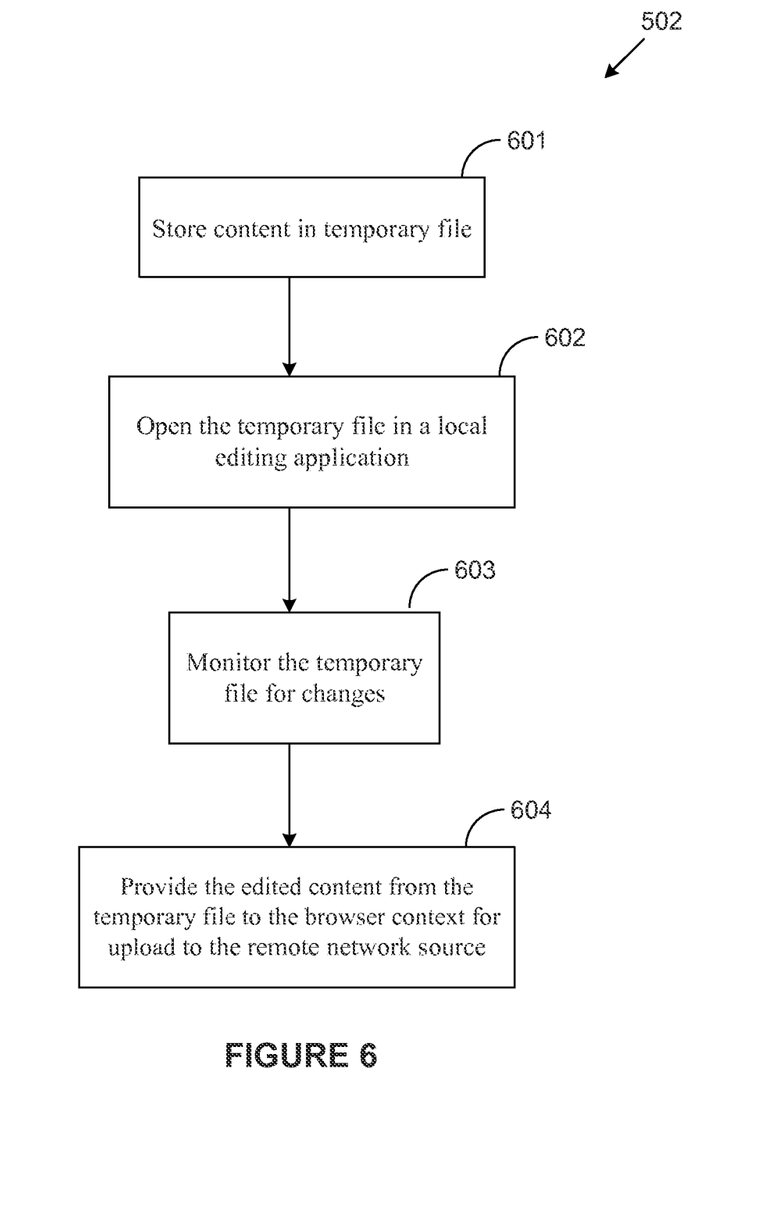
FIG. 6 is a flow chart illustrating an exemplary method of identifying edits made by a local editing application.

FIG. 6 is a flow chart illustrating an exemplary method 502 of identifying edits made by a local editing application. In this example, electronic content is stored in a temporary file, as shown in block 602, and the temporary file 602 is opened in a local editing application, as shown in block 603. The method 502 further involves monitoring the temporary file for changes, as shown in block 603. This may, for example, involve monitoring a last changed file field or a last modified file field of the temporary file to identify when a new version of the temporary file has been saved by the local editing application. Additionally, the method 502 involves providing the edited content from the temporary file to the browser context for upload to the remote network source, as shown in block 604.

Returning to FIG. 5, after identifying edits made at the local editing application to the electronic content resulting in a new version of the electronic content, as shown in block 502, the method 500 further involves initiating an upload of the new version of the electronic content through the browser's network connection to the source, as shown in block 503.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be reordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
   downloading electronic content, the electronic content received from a remote network source accessed through a web browser's connection to the source;
   initiating an agent that is capable of communicating with the web browser;
   creating, via the agent, a locally stored temporary file of the electronic content;
   editing the locally stored temporary file in a local editing application, wherein changes to the locally stored temporary file are made locally by the local editing application, and the local editing application is separate from the web browser and outside of a context of the web browser;
   monitoring, via the agent, the locally stored temporary file for the changes made locally by the local editing application;
   identifying a save of the locally stored temporary file in the local editing application or identifying a new version of the locally stored temporary file;
   identifying edits made locally via the local editing application to the locally stored temporary file; and
   initiating, responsive to identifying the save of the locally stored temporary file in the local editing application or identifying the new version of the locally stored temporary file, an upload of the locally stored temporary file and the identified edits, wherein the upload is initiated via the browser's network connection to the remote network source.

2. The method of claim 1 wherein monitoring, via the agent, the locally stored temporary file for changes comprises identifying the edits made locally.

3. The method of claim 1 wherein script-based commands in a webpage are interpreted by the web browser and communicated to the agent, wherein, responsive to the communication from the web browser, the agent creates the locally stored temporary file, opens the editing application, and monitors the locally stored temporary file for changes.

4. The method of claim 1 wherein the agent accesses script-based commands in a webpage to initiate the upload of the locally stored temporary file and the identified edits.

5. The method of claim 1 wherein the agent is an applet, a rich internet application, or a plug-in.

6. The method of claim 1 wherein the agent is signed to ensure that the agent is trusted.

7. The method of claim 1 wherein identifying edits comprises monitoring a last changed file field or a last modified file field.

8. The method of claim 1 wherein identifying edits comprises identifying when a new version of the locally stored temporary file is saved by the local editing application.

9. The method of claim 1, wherein the upload is initiated responsive to identifying the save of the electronic content in the local editing application.

10. The method of claim 1, wherein the upload is initiated responsive to identifying the save of the electronic content in the local editing application and wherein a same save command used to save content locally also results in initiating the upload of the electronic content.

11. The method of claim 1, wherein the upload is initiated responsive to identifying the new version of the electronic content is locally stored.

12. A system comprising;
a processor; and
a computer-readable medium comprising instructions, the instructions, when executed by the processor, providing steps comprising:
downloading electronic content, the electronic content received from a remote network source accessed through a web browser's connection to the source;
initiating an agent that is capable of communicating with the web browser;
creating, via the agent, a locally stored temporary file of the electronic content;
editing the locally stored temporary file in a local editing application, wherein changes to the locally stored temporary file are made locally by the local editing application, and the local editing application is separate from the web browser and outside of a context of the web browser;
monitoring, via the agent, the locally stored temporary file for the changes made locally by the local editing application;
identifying a save of the locally stored temporary file in the local editing application or identifying a new version of the locally stored temporary file;
identifying edits made locally via the local editing application to the locally stored temporary file and
initiating, responsive to identifying the save of the locally stored temporary file in the local editing application or identifying the new version of the locally stored temporary file, an upload of the locally stored temporary file and the identified edits, wherein the upload is initiated via the browser's network connection to the remote network source.

13. The system of claim 12 wherein monitoring, via the agent, the locally stored temporary file for changes comprises identifying the edits made locally.

14. The system of claim 12 wherein the steps further comprise interpreting script-based commands in a webpage by the web browser and communicating, by the browser, the script-based commands to the agent, wherein, responsive to the communication from the web browser, the agent creates the locally stored temporary file, opens the editing application, and monitors the temporary file for changes.

15. The system of claim 12 wherein the steps further comprise accessing, by the agent, script-based commands in a webpage to initiate the upload of the locally stored temporary file and the identified edits.

16. The system of claim 12 wherein the agent is an applet, a rich internet application, or a plug-in.

17. The system of claim 12 wherein the agent is signed to ensure that the agent is trusted.

18. The system of claim 12 wherein identifying edits comprises monitoring a last changed file field or a last modified file field.

19. The system of claim 12 wherein identifying edits comprises identifying when a new version of the locally stored temporary file is saved by the local editing application.

20. A non-transitory computer-readable medium on which is encoded program code, the program code comprising:
program code for downloading electronic content the electronic content received from a remote network source accessed through a web browser's connection to the source;
program code for initiating an agent that is capable of communicating with the web browser;
program code for creating, via the agent, a locally stored temporary file of the electronic content;
program code for editing the locally stored temporary file in a local editing application, wherein changes to the locally stored temporary file are made locally by the local editing application, and the local editing application is separate from the web browser and outside of a context of the web browser;
program code for monitoring, via the agent, the locally stored temporary file for the changes made locally by the local editing application;
program code for identifying a save of the locally stored temporary file in the local editing application or identifying a new version of the locally stored temporary file;
program code for identifying edits made locally via the local editing application to the locally stored temporary file and
program code for initiating, responsive to identifying the save of the locally stored temporary file in the local editing application or identifying the new version of the locally stored temporary file, an upload of the temporary file and the identified edits, wherein the upload is initiated via the browser's network connection to the remote network source.

21. The medium of claim 20 wherein monitoring, via the agent, the locally stored temporary file for changes comprises identifying the edits made locally.

22. The medium of claim 20 wherein the program code further comprises program code for interpreting script-based commands in a webpage by the web browser and communicating, by the browser, the script-based commands to the agent, wherein responsive to the communication from the web browser, the agent creates the locally stored temporary file, opens the editing application, and monitors the locally stored temporary file for changes.

* * * * *